(12) United States Patent
Fukuhara et al.

(10) Patent No.: US 11,854,274 B2
(45) Date of Patent: Dec. 26, 2023

(54) IN-VEHICLE MONITORING INFORMATION GENERATION CONTROL DEVICE AND IN-VEHICLE MONITORING INFORMATION GENERATION CONTROL METHOD

(71) Applicant: Mitsubishi Electric Corporation, Tokyo (JP)

(72) Inventors: Hideki Fukuhara, Tokyo (JP); Yoshitaka Wakisaka, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 508 days.

(21) Appl. No.: 17/269,070

(22) PCT Filed: Sep. 13, 2018

(86) PCT No.: PCT/JP2018/034017
§ 371 (c)(1),
(2) Date: Feb. 17, 2021

(87) PCT Pub. No.: WO2020/054030
PCT Pub. Date: Mar. 19, 2020

(65) Prior Publication Data
US 2021/0209384 A1     Jul. 8, 2021

(51) Int. Cl.
| | |
|---|---|
| *G06V 20/59* | (2022.01) |
| *G08B 21/02* | (2006.01) |
| *G06V 30/19* | (2022.01) |
| *G05D 1/02* | (2020.01) |

(52) U.S. Cl.
CPC ............ *G06V 20/59* (2022.01); *G06V 30/19* (2022.01); *G08B 21/02* (2013.01); *G05D 1/0231* (2013.01)

(58) Field of Classification Search
CPC ........ G06V 20/59; G06V 30/19; G08B 21/02; G08B 13/19647; G08B 13/19686;
(Continued)

(56) References Cited

U.S. PATENT DOCUMENTS 11,687,493 B1 * 6/2023 Maturana ............. G06F 16/176
709/201
2013/0335584 A1   12/2013 Kato et al.
(Continued)

FOREIGN PATENT DOCUMENTS

| CN | 103516990 A | 1/2014 |
|---|---|---|
| CN | 204801768 U | 11/2015 |

(Continued)

OTHER PUBLICATIONS

Office Action dated Sep. 28, 2022 issued by the Chinese Patent Office in Chinese Application No. 201880097218.X.
(Continued)

*Primary Examiner* — John B Strege
(74) *Attorney, Agent, or Firm* — Sughrue Mion, PLLC; Richard C. Turner

(57) ABSTRACT

An in-vehicle monitoring information generation control device includes: an image acquisition unit acquiring an image generated by capturing the inside of an unmanned vehicle; an abnormality determination unit determining whether or not an abnormality is occurring in the unmanned vehicle; an in-vehicle monitoring information generating unit generating in-vehicle monitoring information, with which no passenger in the unmanned vehicle who is captured in the image can be identified, on the basis of the image acquired by the image acquisition unit; and a transmission control unit transmitting the in-vehicle monitoring information generated by the in-vehicle monitoring information generating unit to the outside of the unmanned vehicle in a case where it is determined that no abnormality is occurring in the unmanned vehicle on the basis of a determination result determined by the abnormality determination unit.

7 Claims, 13 Drawing Sheets

(58) Field of Classification Search
CPC ........... G05D 1/0231; B60W 40/08; B60W 2540/221; B60W 2540/223; B60W 2540/26; B60W 2556/45; B60R 16/037
See application file for complete search history.

(56) References Cited

U.S. PATENT DOCUMENTS

2017/0164291 A1* 6/2017 Ludwig ............ H04W 52/0245
2017/0220816 A1* 8/2017 Matusek ............ G06F 21/6245

FOREIGN PATENT DOCUMENTS

| JP | 2002-033952 A | | 1/2002 |
| JP | 2011-205373 | * | 3/2010 |
| JP | 3178027 U | | 8/2012 |
| JP | 2014-017803 A | | 1/2014 |
| JP | 2014-216828 A | | 11/2014 |
| JP | 2018-018457 A | | 2/2018 |
| JP | 2018-020725 A | | 2/2018 |

OTHER PUBLICATIONS

Communication dated Jan. 19, 2022, issued by the Chinese Patent Office in application No. 201880097218.X.
DeNA Co., Ltd, Online, "Nissan and DeNA to Start Easy Ride Robo-Vehicle Mobility Service Trial", Feb. 23, 2018; <URL:http://dena.com/jp/press/2018/02/23/1/>.
International Search Report for PCT/JP2018/034017 dated Oct. 16, 2018 (PCT/ISA/210).

* cited by examiner

FIG. 10

| Throughput | Type of In-Vehicle Monitoring Information |
|---|---|
| High | Deformed Image Information |
| Intermediate | Contour Image Information |
| Low | Individual Identification Information |

# IN-VEHICLE MONITORING INFORMATION GENERATION CONTROL DEVICE AND IN-VEHICLE MONITORING INFORMATION GENERATION CONTROL METHOD

CROSS REFERENCE TO RELATED APPLICATIONS

This application is a National Stage of International Application No. PCT/JP2018/034017 filed Sep. 13, 2018.

TECHNICAL FIELD

The present invention relates to an in-vehicle monitoring information generation control device and an in-vehicle monitoring information generation control method.

BACKGROUND ART

Providing transportation means using unmanned vehicles has been investigated.

For example, Non-Patent Literature 1 discloses that a remote control center is set up which is capable of recognizing the position and the state of a traveling unmanned vehicle in real time and that remote control is performed at the remote control center in a verification test of a transportation service using unmanned vehicles in order to ensure that passengers can use the vehicle at ease.

CITATION LIST

Non-Patent Literature

Non-Patent Literature 1: "Nissan and DeNA to Start Easy Ride Robo-Vehicle Mobility Service Trial", [online], Feb. 23, 2018, DeNA Co., Ltd., Retrieved on Jul. 24, 2018 from the Internet <URL: http://dena.com/jp/press/2018/02/23/1/>

SUMMARY OF INVENTION

Technical Problem

In a case where the state of a traveling unmanned vehicle is recognized in real time, it can be considered that an image captured by an imaging device installed in the unmanned vehicle for taking an image of the cabin is transmitted to a remote control center or the like. However, there is a disadvantage that privacy of the passenger may be impaired if the image of the cabin captured by the imaging device is transmitted to the remote control center or the like in a case where there is a passenger in the unmanned vehicle.

The present invention has been made to solve the above-mentioned disadvantage, and an object of the invention is to provide an in-vehicle monitoring information generation control device capable of performing in-vehicle monitoring with consideration for privacy of passengers onboard an unmanned vehicle.

Solution to Problem

An in-vehicle monitoring information generation control device according to the present invention includes a processing circuitry to acquire an image generated by capturing an inside of an unmanned vehicle, to generate a determination result of determining whether or not an abnormality is occurring in the unmanned vehicle, to generate in-vehicle monitoring information, with which no passenger in the unmanned vehicle who is captured in the image can be identified, on a basis of the image, to transmit the in-vehicle monitoring information to an outside of the unmanned vehicle in a case where it is determined that no abnormality is occurring in the unmanned vehicle on a basis of the determination result, to estimate a throughput value indicating an amount of data transfer per unit time when the in-vehicle monitoring information is transmitted to the outside of the unmanned vehicle, and to determine a type of the in-vehicle monitoring information on a basis of the throughput value being estimated, wherein the type of the in-vehicle monitoring information being determined on a basis of the throughput value is any one of deformed image information obtained by deforming an area of the passenger captured in the image, contour image information obtained by extracting a contour of the area, or individual identification information that identifies the passenger captured in the image, and the processing circuitry generates the in-vehicle monitoring information on a basis of the type.

Advantageous Effects of Invention

According to the present invention, it is possible to monitor the inside of a vehicle with consideration for privacy of passengers onboard the unmanned vehicle.

BRIEF DESCRIPTION OF DRAWINGS

FIG. 10 is a table illustrating an example of a type determination table used by a type determination unit in the in-vehicle monitoring information generation control device according to the second embodiment for determining the type of in-vehicle monitoring information on the basis of a throughput value estimated by a throughput value estimating unit.

DESCRIPTION OF EMBODIMENTS

Hereinafter, some embodiments of the present invention will be described in detail with reference to the drawings.

First Embodiment

Figure 1:
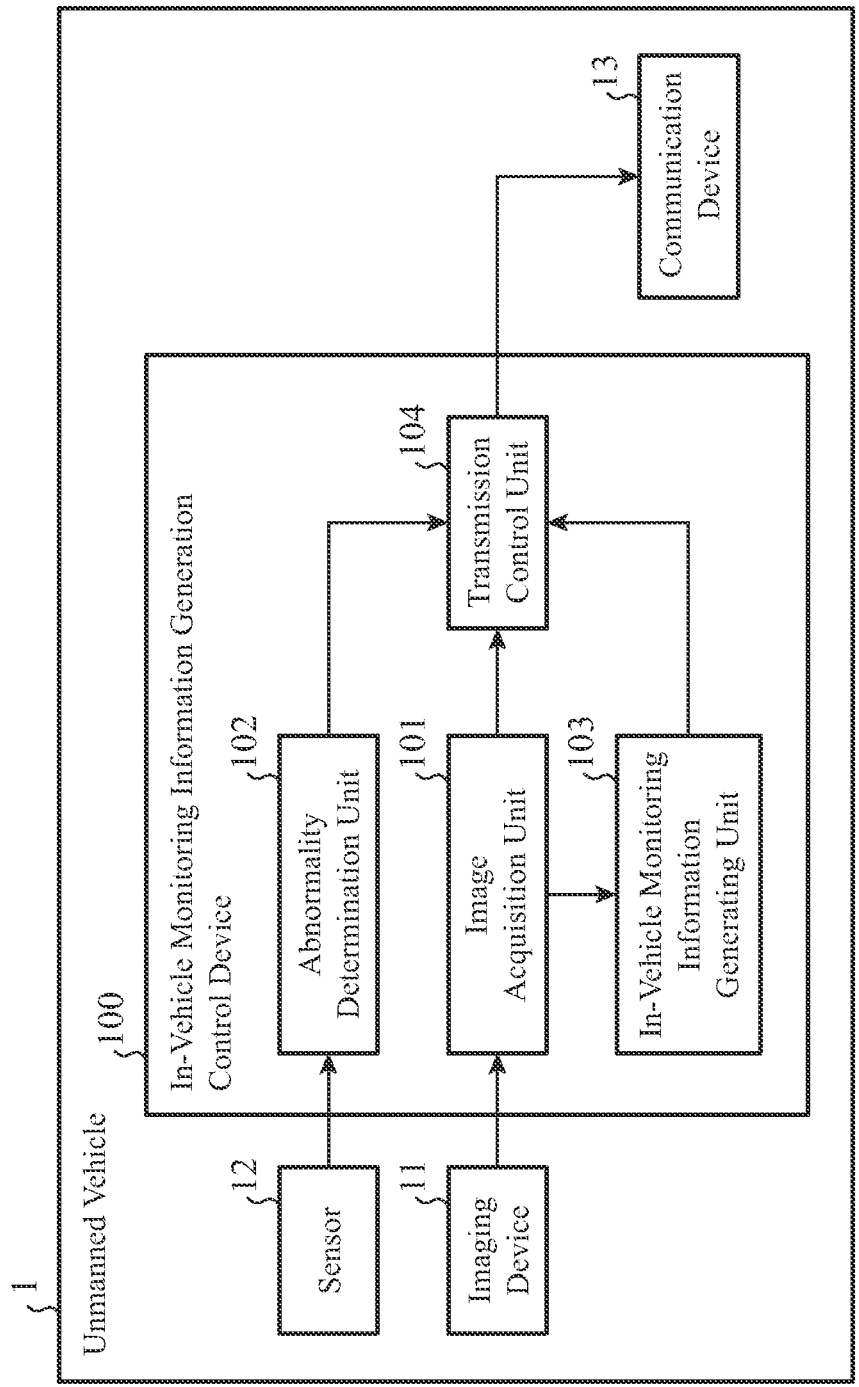
FIG. 1 is a block diagram illustrating an example of the main part of an unmanned vehicle mounted with an in-vehicle monitoring information generation control device according to a first embodiment.

FIG. 1 is a block diagram illustrating an example of the main part of an unmanned vehicle 1 mounted with an in-vehicle monitoring information generation control device 100 according to a first embodiment.

The unmanned vehicle 1 is, for example, a vehicle applied with technology classified as Level 5 of driving automation technology, which is a vehicle capable of autonomously traveling even in a state where there is no passenger in the vehicle at all.

The in-vehicle monitoring information generation control device 100 is mounted on the unmanned vehicle 1.

The unmanned vehicle 1 includes the in-vehicle monitoring information generation control device 100, an imaging device 11, a sensor 12, and a communication device 13.

The imaging device 11 captures an image of the inside of the unmanned vehicle 1. The imaging device 11 is, for example, a camera installed in the unmanned vehicle 1. The imaging device 11 outputs data of the captured image (hereinafter, "data of the captured image" is also simply referred to as an "image") to the in-vehicle monitoring information generation control device 100.

The sensor 12 outputs detection information for the in-vehicle monitoring information generation control device 100 to determine whether or not an abnormality is occurring in the unmanned vehicle 1. The sensor 12 is, for example, an infrared sensor, an ultrasonic sensor, or an audio volume sensor. The sensor 12 may also be a biosensor for outputting information indicating the heartbeat, blood pressure, etc. of a passenger. The biosensor is attached to a seat belt, a seat, or other places.

The communication device 13 has a communication function for transmitting in-vehicle monitoring information such as image information output by the in-vehicle monitoring information generation control device 100 to the outside of the unmanned vehicle 1. More specifically, the communication device 13 has a communication function for transmitting in-vehicle monitoring information to, for example, an external device or an external system provided outside the unmanned vehicle 1. The external device is for example a remote monitoring device, and the external system is, for example, a remote monitoring system. The communication device 13 transmits the in-vehicle monitoring information to the outside of the unmanned vehicle 1 by using a wireless public line such as the Long-Term Evolution (LTE).

The in-vehicle monitoring information generation control device 100 generates in-vehicle monitoring information on the basis of the image acquired from the imaging device 11, and transmits the in-vehicle monitoring information to the outside of the unmanned vehicle 1 via the communication device 13 depending on the state of the unmanned vehicle 1 determined on the basis of the detection information acquired from the sensor 12.

The in-vehicle monitoring information generation control device 100 includes an image acquisition unit 101, an abnormality determination unit 102, an in-vehicle monitoring information generating unit 103, and a transmission control unit 104.

The image acquisition unit 101 acquires an image generated by capturing the inside of the unmanned vehicle 1 from the imaging device 11.

The abnormality determination unit 102 determines whether or not an abnormality is occurring in the unmanned vehicle 1.

For example, the abnormality determination unit 102 acquires detection information from the sensor 12 and determines whether or not an abnormality is occurring in the unmanned vehicle 1 on the basis of the acquired detection information.

More specifically, for example, the abnormality determination unit 102 determines whether or not an abnormality is occurring in the unmanned vehicle 1 by determining whether or not the posture, the motion, or the like of the passenger of the unmanned vehicle 1 is in a predetermined abnormal state by a well-known pattern matching method on the basis of detection information acquired from a detection sensor such as an infrared sensor or an ultrasonic sensor.

Alternatively, for example, the abnormality determination unit 102 determines whether or not an abnormality is occurring in the unmanned vehicle 1 by determining whether or not the volume in the unmanned vehicle 1 is higher than a predetermined volume on the basis of detection information acquired from an audio volume sensor.

Further alternatively, for example, the abnormality determination unit 102 determines whether or not an abnormality is occurring in the unmanned vehicle 1 by determining for example whether or not the physical condition of a passenger of the unmanned vehicle 1 is good or whether or not the passenger is in an excited state on the basis of detection information acquired from a biosensor, for example, depending on whether or not a value indicating the heartrate, the blood pressure, or the like is greater than a predetermined value.

The method by which the abnormality determination unit 102 determines whether or not an abnormality is occurring in the unmanned vehicle 1 is not limited to the methods described above.

For example, whether or not an abnormality is occurring in the unmanned vehicle 1 may be determined on the basis of a plurality of types of detection information acquired from a plurality of types of sensors 12 having different detection methods.

Alternatively, for example, the in-vehicle monitoring information generation control device 100 may be connected to an in-vehicle network such as a controller area network (CAN) in the unmanned vehicle 1, and the abnormality determination unit 102 may determine whether or not an abnormality is occurring in the unmanned vehicle 1 using various signals acquired from the in-vehicle network as appropriate.

Further alternatively, for example, the abnormality determination unit 102 may determine whether or not an abnormality is occurring in the unmanned vehicle 1 by comparing a result of analyzing an image, capturing the inside of the unmanned vehicle 1 acquired by the image acquisition unit 101 by known image analysis technology, with a pattern indicating a predetermined abnormal state by a well-known pattern matching method. Incidentally, in a case where the abnormality determination unit 102 determines whether or not an abnormality is occurring on the basis of the image acquired by the image acquisition unit 101, the abnormality determination unit 102 is connected to the image acquisition unit 101 (however, this connection is not illustrated in FIG. 1.) In a case where the abnormality determination unit 102 determines whether or not an abnormality is occurring on the basis of the image generated by capturing the inside of the unmanned vehicle 1, the abnormality determination unit 102 may be directly connected to the imaging device 11 (however, this connection is not illustrated in FIG. 1.)

Moreover, for example, the abnormality determination unit 102 may determine whether or not an abnormality is occurring in the unmanned vehicle 1 by acquiring an audio signal from an audio input device (not illustrated) such as a microphone, performing voice recognition by known voice recognition technology on the basis of the acquired voice signal, and comparing a result of the voice recognition with a voice pattern indicating a predetermined abnormal state.

Furthermore, for example, the abnormality determination unit 102 may determine whether or not an abnormality is occurring in the unmanned vehicle 1 by combining the above-described methods for determining whether or not an abnormality is occurring in the unmanned vehicle 1 as appropriate.

The in-vehicle monitoring information generating unit 103 generates in-vehicle monitoring information, with which no passenger in the unmanned vehicle 1 (hereinafter, a passenger onboard the unmanned vehicle 1 is simply referred to as a "passenger") captured in an image can be identified, on the basis of the image acquired by the image acquisition unit 101. Details of the in-vehicle monitoring information generating unit 103 will be described later.

The transmission control unit 104 transmits the in-vehicle monitoring information generated by the in-vehicle monitoring information generating unit 103 to the outside of the unmanned vehicle 1 in a case where it is determined that no abnormality is occurring in the unmanned vehicle 1 on the basis of a determination result determined by the abnormality determination unit 102.

More specifically, the transmission control unit 104 performs transmission control for transmitting the in-vehicle monitoring information to transmit the in-vehicle monitoring information to the outside of the unmanned vehicle 1 via the communication device 13.

The transmission control unit 104 transmits the in-vehicle monitoring information to the outside of the unmanned vehicle 1 in a case where it is determined that no abnormality is occurring in the unmanned vehicle 1. Alternatively, the transmission control unit 104 transmits an abnormality monitoring image based on the image acquired by the image acquisition unit 101 to the outside of the unmanned vehicle 1 in a case where it is determined that an abnormality is occurring in the unmanned vehicle 1.

More specifically, for example, the abnormality monitoring image is an image acquired by the image acquisition unit 101.

The abnormality monitoring image is not limited to images acquired by the image acquisition unit 101, and may be, for example, an image generated by processing those images.

More specifically, for example, an abnormality monitoring image is an image generated by performing, on the image acquired by the image acquisition unit 101, a process such as a resizing process of changing the size of the image, a cropping process of cutting out a position in the image where it is estimated that an abnormality is occurring, or a superimposing process of adding information indicating a position in the image where it is estimated that an abnormality is occurring. Note that it is desirable that in-vehicle monitoring information does not allow any passenger to be identified, whereas an abnormality monitoring image allows a passenger to be identified.

Figure 2A:
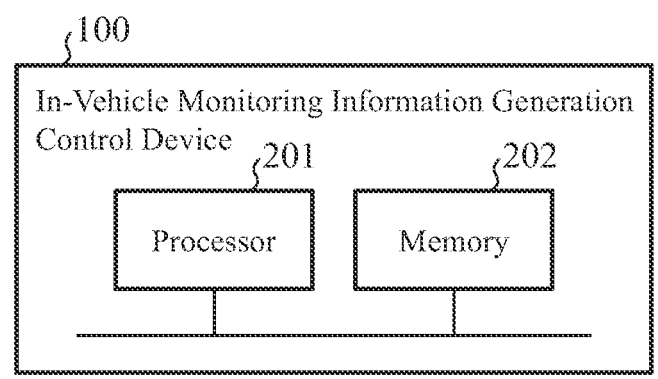
FIGS. 2A and 2B are diagrams each illustrating an exemplary hardware configuration of the in-vehicle monitoring information generation control device according to the first embodiment.
Figure 2B:
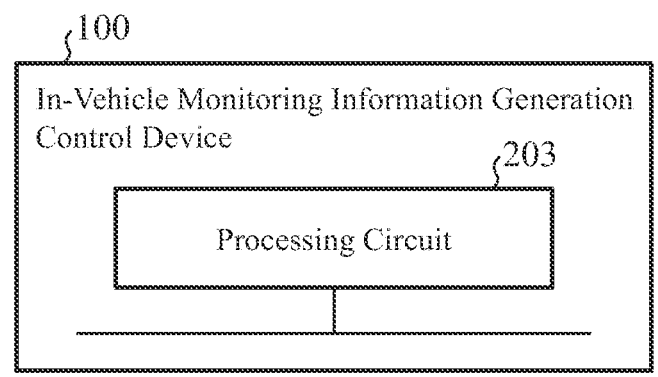

With reference to FIGS. 2A and 2B, hardware configurations of the main part of the in-vehicle monitoring information generation control device 100 according to the first embodiment will be described.

FIGS. 2A and 2B are diagrams each illustrating an exemplary hardware configuration of the in-vehicle monitoring information generation control device 100 according to the first embodiment.

As illustrated in FIG. 2A, the in-vehicle monitoring information generation control device 100 includes a computer, and the computer includes a processor 201 and a memory 202. The memory 202 stores a program for causing the computer to function as the image acquisition unit 101, the abnormality determination unit 102, the in-vehicle monitoring information generating unit 103, and the transmission control unit 104. By reading out and executing the program stored in the memory 202 by the processor 201, the functions of the image acquisition unit 101, the abnormality determination unit 102, the in-vehicle monitoring information generating unit 103, and the transmission control unit 104 are implemented.

Alternatively, as illustrated in FIG. 2B, the in-vehicle monitoring information generation control device 100 may include a processing circuit 203. In this case, the functions of the image acquisition unit 101, the abnormality determination unit 102, the in-vehicle monitoring information generating unit 103, and the transmission control unit 104 may be implemented by the processing circuit 203.

Further alternatively, the in-vehicle monitoring information generation control device 100 may include a processor 201, a memory 202, and a processing circuit 203 (not illustrated). In this case, some of the functions of the image acquisition unit 101, the abnormality determination unit 102, the in-vehicle monitoring information generating unit 103, and the transmission control unit 104 may be implemented by the processor 201 and the memory 202, and the remaining functions may be implemented by the processing circuit 203.

The processor 201 includes, for example, a central processing unit (CPU), a graphics processing unit (GPU), a microprocessor, a micro controller, or a digital signal processor (DSP).

The memory 202 includes, for example, a semiconductor memory or a magnetic disk. More specifically, the memory 202 includes, for example, a random access memory (RAM), a read only memory (ROM), a flash memory, an erasable programmable read only memory (EPROM), an electrically erasable programmable read-only memory (EEPROM), a solid state drive (SSD), or a hard disk drive (HDD).

The processing circuit 203 includes, for example, an application specific integrated circuit (ASIC), a programmable logic device (PLD), a field-programmable gate array (FPGA), a system-on-a-chip (SoC), or a system large-scale integration (LSI).

Figure 3:
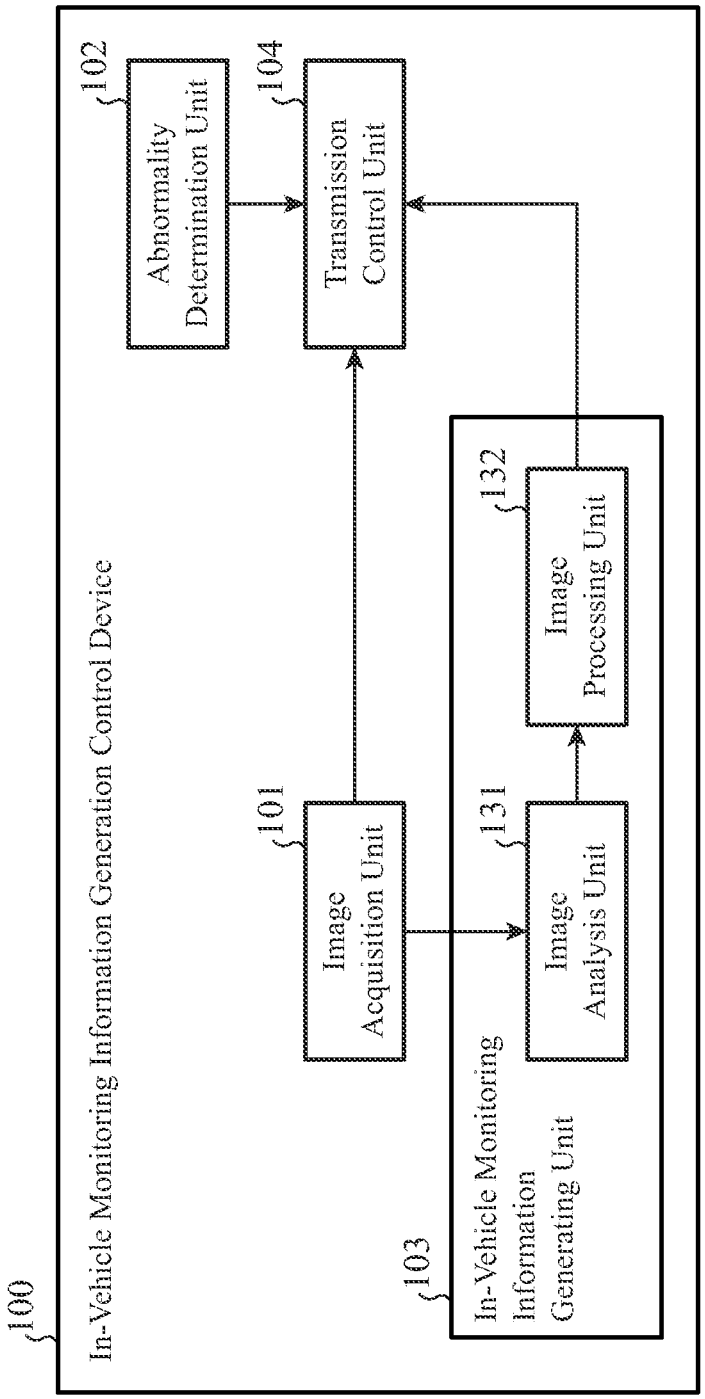
FIG. 3 is a block diagram illustrating an example of the main part of an in-vehicle monitoring information generating unit in the in-vehicle monitoring information generation control device according to the first embodiment.
Figure 4:
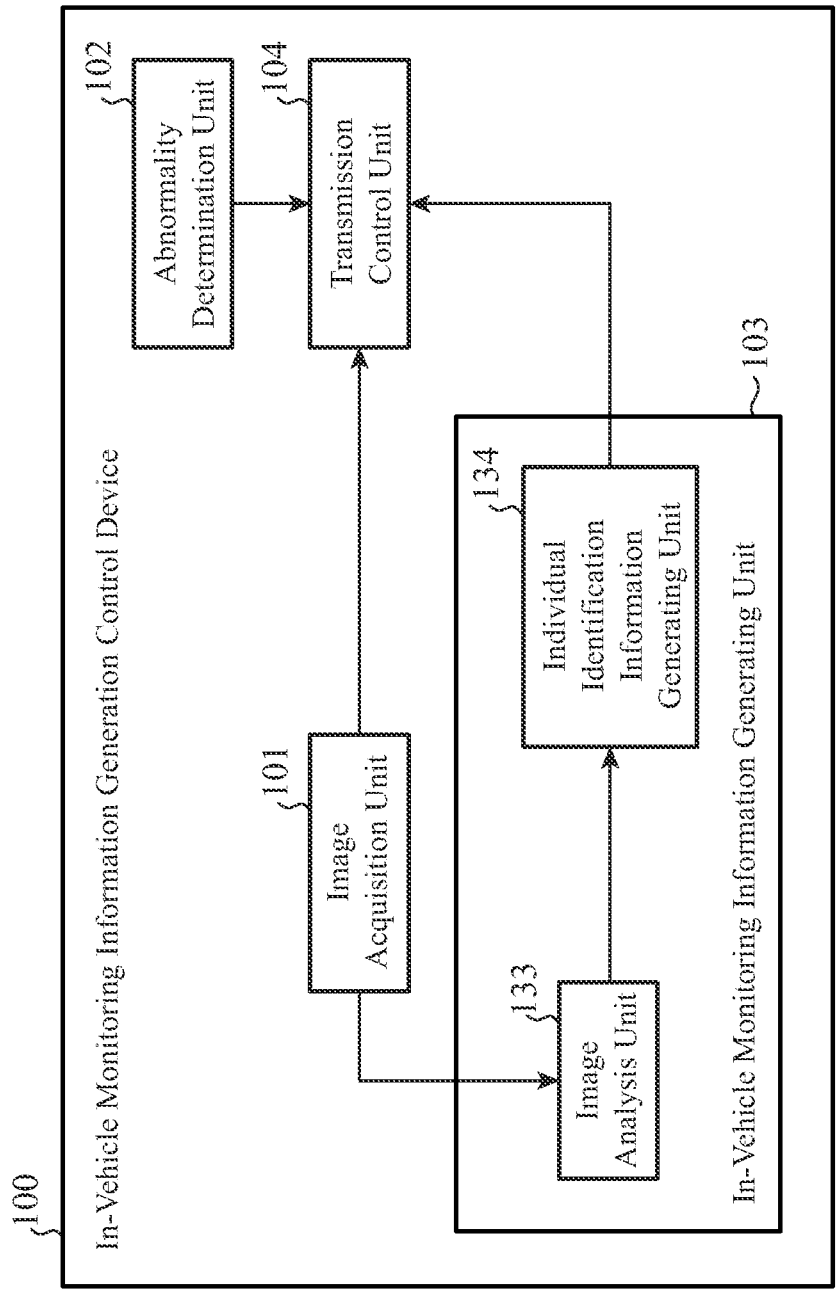
FIG. 4 is a block diagram illustrating an example of the main part of the in-vehicle monitoring information generating unit in the in-vehicle monitoring information generation control device according to the first embodiment.

With reference to FIGS. 3 and 4, processes will be described by which the in-vehicle monitoring information generating unit 103 generates in-vehicle monitoring information that allows no passenger captured in an image to be identified on the basis of the image acquired by the image acquisition unit 101.

FIG. 3 is a block diagram illustrating an example of the main part of the in-vehicle monitoring information generating unit 103 in the in-vehicle monitoring information generation control device 100 according to the first embodiment.

The in-vehicle monitoring information generating unit 103 includes, for example, an image analysis unit 131 and an image processing unit 132.

The image analysis unit 131 detects, for example, an area of a passenger's face captured in an image acquired by the image acquisition unit 101 by a known method.

The image processing unit 132 performs, for example, an image deformation process or a contour extraction process on an area of the passenger's face detected by the image analysis unit 131 in the image acquired by the image acquisition unit 101 by a known method. The image deformation process is a process of deforming an image by performing, for example, pixelization or blurring on an area of the passenger's face in the image. The contour extraction process is a process of extracting only the contour of a passenger's face by, for example, filling in black or performing a masking process on the area of the passenger's face in the image. The image processing unit 132 outputs, as in-vehicle monitoring information, information such as deformed image information obtained by performing the above-described image deformation process on the image acquired by the image acquisition unit 101 or contour image information obtained by performing the above-described contour extraction process on the image acquired by the image acquisition unit 101.

The configuration of the main part of the in-vehicle monitoring information generating unit 103 in the in-vehicle monitoring information generation control device 100 according to the first embodiment is not limited to the configuration illustrated in FIG. 3, and may be, for example, a configuration illustrated in FIG. 4.

FIG. 4 is a block diagram illustrating an example of the main part of the in-vehicle monitoring information generating unit 103 in the in-vehicle monitoring information generation control device 100 according to the first embodiment.

The in-vehicle monitoring information generating unit 103 includes, for example, an image analysis unit 133 and an individual identification information generating unit 134.

The image analysis unit 133 identifies a passenger captured in the image by a known method for example on the basis of the image acquired by the image acquisition unit 101. More specifically, for example, the image analysis unit 133 identifies the gender, the age, the physique, etc. of the passenger captured in the image.

The individual identification information generating unit 134 generates individual identification information on the basis of an identification result of the passenger identified by the image analysis unit 133 in accordance with a predetermined format, and outputs the individual identification information as in-vehicle monitoring information.

The operation of the in-vehicle monitoring information generation control device 100 according to the first embodiment will be described with reference to FIG. 5.

Figure 5:
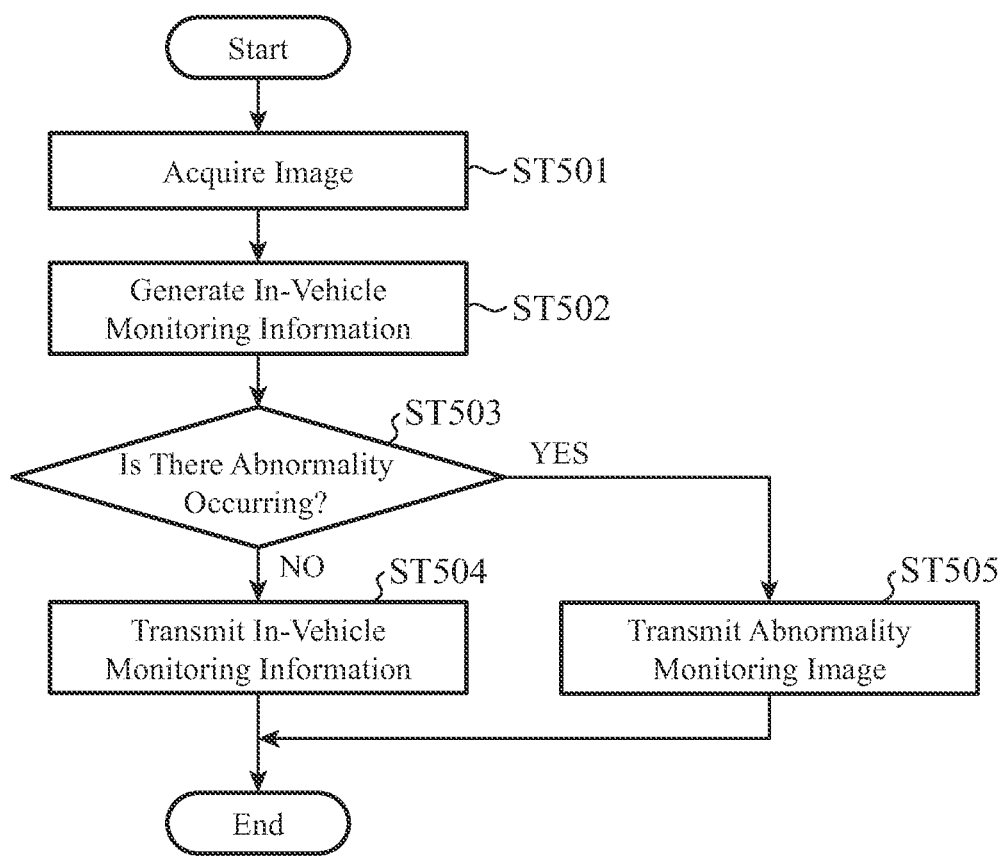
FIG. 5 is a flowchart explaining an example of processes in the in-vehicle monitoring information generation control device according to the first embodiment.

FIG. 5 is a flowchart illustrating an example of processes of the in-vehicle monitoring information generation control device 100 according to the first embodiment.

First, in step ST501, the image acquisition unit 101 acquires an image generated by capturing the inside of the unmanned vehicle 1 from the imaging device 11 as described above.

Next, in step ST502, the in-vehicle monitoring information generating unit 103 generates in-vehicle monitoring information, with which no passenger captured in the image can be identified, on the basis of the image acquired by the image acquisition unit 101 as described above.

Next, in step ST503, the abnormality determination unit 102 determines whether or not an abnormality is occurring in the unmanned vehicle 1 as described above.

If the abnormality determination unit 102 determines in step ST503 that no abnormality is occurring in the unmanned vehicle 1, the transmission control unit 104 transmits the in-vehicle monitoring information generated by the in-vehicle monitoring information generating unit 103 to the outside of the unmanned vehicle 1 in step ST504 as described above. After performing the process of step ST504, the in-vehicle monitoring information generation control device 100 ends the processes of the flowchart and returns to the process of step ST501 to repeatedly execute the processes of the flowchart.

If the abnormality determination unit 102 determines in step ST503 that an abnormality is occurring in the unmanned vehicle 1, the transmission control unit 104 transmits an abnormality monitoring image based on the image acquired by the image acquisition unit 101 to the outside of the unmanned vehicle 1 in step ST505. After executing the process of step ST505, the in-vehicle monitoring information generation control device 100 ends the processes of the flowchart and returns to the process of step ST501 to repeatedly execute the processes of the flowchart.

Note that the process of step ST503 may be repeatedly executed as appropriate in a background process while the flowchart illustrated in FIG. 5 is being executed.

As described above, the in-vehicle monitoring information generation control device 100 includes: the image acquisition unit 101 for acquiring an image generated by capturing the inside of the unmanned vehicle 1; the abnormality determination unit 102 for determining whether or not an abnormality is occurring in the unmanned vehicle 1; the in-vehicle monitoring information generating unit 103 for generating in-vehicle monitoring information, with which no passenger in the unmanned vehicle 1 who is captured in the image can be identified, on the basis of the image acquired by the image acquisition unit 101; and the transmission control unit 104 for transmitting the in-vehicle monitoring information generated by the in-vehicle monitoring information generating unit 103 to the outside of the unmanned vehicle 1 in a case where it is determined that no abnormality is occurring in the unmanned vehicle 1 on the basis of a determination result determined by the abnormality determination unit 102.

With this configuration, the in-vehicle monitoring information generation control device 100 can monitor the inside of the vehicle with consideration for privacy of passengers onboard the unmanned vehicle 1.

Note that the abnormality determination unit 102 may determine not only whether or not an abnormality is occurring in the unmanned vehicle 1, but also the content of the abnormality occurring in the unmanned vehicle 1. More specifically, for example, the abnormality determination unit 102 may determine whether or not the abnormality occurring in the unmanned vehicle 1 is due to bad condition of the passenger. Whether or not the occurring abnormality is due to bad condition of the passenger can be determined by, for example, comparing a result of voice recognition performed on the basis of the audio signal acquired by the abnormality determination unit 102 with a predetermined voice pattern indicating the bad condition of a passenger.

Furthermore, in a case where the abnormality occurring in the unmanned vehicle 1 is due to bad condition of the passenger according to the determination result determined by the abnormality determination unit 102, the transmission control unit 104 may transmit the in-vehicle monitoring information, instead of the abnormality monitoring image, to the outside of the unmanned vehicle 1.

With this configuration, the in-vehicle monitoring information generation control device 100 can monitor the inside of the vehicle with consideration for privacy of passengers in a case where the abnormality occurring in the unmanned vehicle 1 is attributable to bad condition of the passenger.

Modification of First Embodiment

A modification of the first embodiment will be described with reference to FIG. 6.

Figure 6:
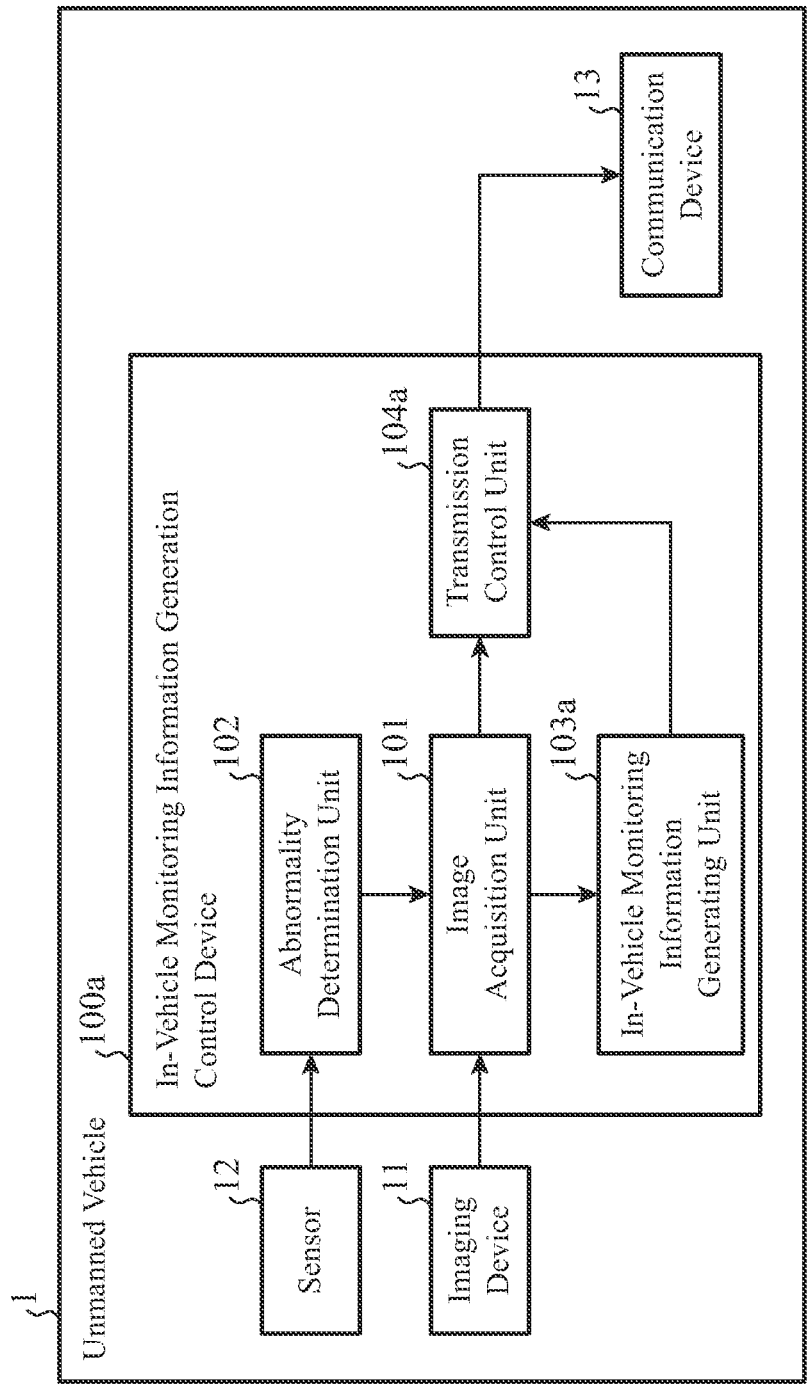
FIG. 6 is a block diagram illustrating an example of the main part of an unmanned vehicle mounted with an in-vehicle monitoring information generation control device according to a modification of the first embodiment.

FIG. 6 is a block diagram illustrating an example of the main part of an unmanned vehicle 1 mounted with an in-vehicle monitoring information generation control device 100a according to a modification of the first embodiment.

The in-vehicle monitoring information generation control device 100a according to the modification of the first embodiment is different from the in-vehicle monitoring information generation control device 100 in that the operation of an in-vehicle monitoring information generating unit 103a and a transmission control unit 104a in the in-vehicle monitoring information generation control device 100a is different from the operation of the in-vehicle monitoring information generating unit 103 and the transmission control unit 104 in the in-vehicle monitoring information generation control device 100.

In the configuration of the in-vehicle monitoring information generation control device 100a according to the modification of the first embodiment, components similar to those in the in-vehicle monitoring information generation control device 100 are denoted with the same symbols and redundant description will be omitted. That is, description of components in FIG. 6 denoted by the same symbols as those illustrated in FIG. 1 will be omitted.

The in-vehicle monitoring information generation control device 100a is mounted on the unmanned vehicle 1.

The unmanned vehicle 1 includes the in-vehicle monitoring information generation control device 100a, an imaging device 11, a sensor 12, and a communication device 13.

The in-vehicle monitoring information generation control device 100a generates in-vehicle monitoring information on the basis of an image acquired from the imaging device 11, and transmits the in-vehicle monitoring information to the outside of the unmanned vehicle 1 via the communication device 13 depending on the state of the unmanned vehicle 1 determined on the basis of the detection information acquired from the sensor 12.

The in-vehicle monitoring information generation control device 100a includes an image acquisition unit 101, an abnormality determination unit 102, an in-vehicle monitoring information generating unit 103a, and a transmission control unit 104a.

In a case where it is determined that no abnormality is occurring in the unmanned vehicle 1 on the basis of the determination result determined by the abnormality determination unit 102, the in-vehicle monitoring information generating unit 103a generates in-vehicle monitoring information, with which no passenger captured in the image can be identified on the basis of the image acquired by the image acquisition unit 101.

Since the process by which the in-vehicle monitoring information generating unit 103a generates in-vehicle monitoring information on the basis of the image acquired from the image acquisition unit 101 is similar to that of the in-vehicle monitoring information generating unit 103 in the in-vehicle monitoring information generation control device 100, and thus the description will be omitted.

The transmission control unit 104a transmits the in-vehicle monitoring information generated by the in-vehicle monitoring information generating unit 103a to the outside of the unmanned vehicle 1. The in-vehicle monitoring information generating unit 103a generates in-vehicle monitoring information on the basis of the determination result determined by the abnormality determination unit 102 when it is determined that no abnormality is occurring in the unmanned vehicle 1. When the in-vehicle monitoring information is generated, the transmission control unit 104a transmits the in-vehicle monitoring information to the outside of the unmanned vehicle 1. Since the in-vehicle monitoring information is generated when it is determined that no abnormality is occurring in the unmanned vehicle 1, the transmission control unit 104a transmits the in-vehicle monitoring information to the outside of the unmanned vehicle 1 also when it is determined that no abnormality is occurring. The transmission control unit 104a transmits an abnormality monitoring image based on the image acquired by the image acquisition unit 101 to the outside of the unmanned vehicle 1 in a case where there is no in-vehicle monitoring information to be transmitted, that is, where it is determined that an abnormality is occurring in the unmanned vehicle 1.

Note that the functions of the image acquisition unit 101a, the abnormality determination unit 102, the in-vehicle monitoring information generating unit 103a, and the transmission control unit 104a in the in-vehicle monitoring information generation control device 100a according to the modification of the first embodiment may be implemented by the processor 201 and the memory 202 or may be implemented by the processing circuit 203 in the hardware configurations exemplified in FIGS. 2A and 2B in the first embodiment.

The operation of the in-vehicle monitoring information generation control device 100a according to the modification of the first embodiment will be described with reference to FIG. 7.

Figure 7:
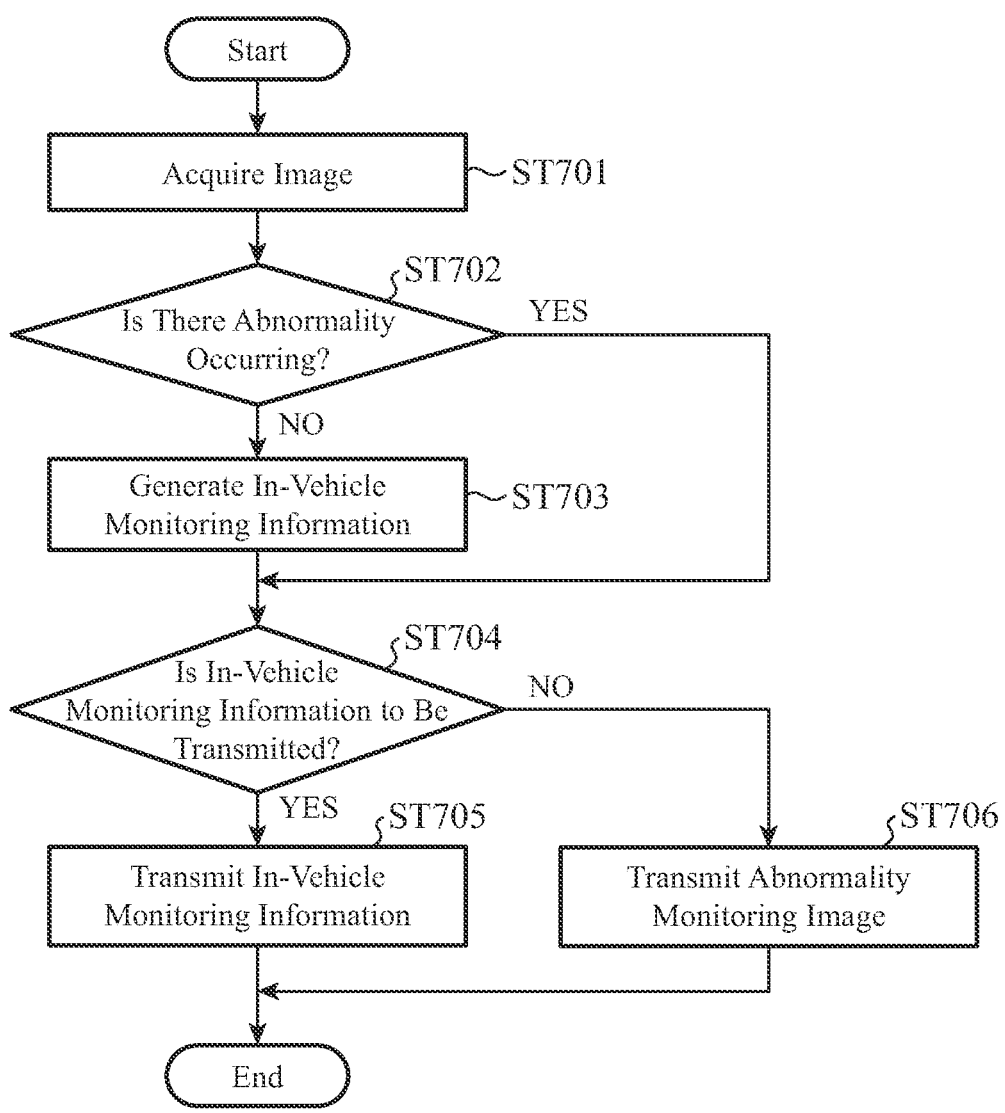
FIG. 7 is a flowchart explaining an example of processes in the in-vehicle monitoring information generation control device according to the modification of the first embodiment.

FIG. 7 is a flowchart explaining an example of processes in the in-vehicle monitoring information generation control device 100a according to the modification of the first embodiment.

First, in step ST701, the image acquisition unit 101 acquires an image generated by capturing the inside of the unmanned vehicle 1 from the imaging device 11 as described above.

Next, in step ST702, the abnormality determination unit 102 determines whether or not an abnormality is occurring in the unmanned vehicle 1 as described above.

In step ST702, if the abnormality determination unit 102 determines that no abnormality is occurring in the unmanned vehicle 1, the in-vehicle monitoring information generating unit 103a generates in-vehicle monitoring information, with which no passenger captured in the image can be identified, on the basis of the image acquired by the image acquisition unit 101 as described above in step ST703. After the process of step ST703, the in-vehicle monitoring information generation control device 100a executes the process of step ST704 described later.

In step ST702, if the abnormality determination unit 102 determines that an abnormality is occurring in the unmanned vehicle 1, the in-vehicle monitoring information generation control device 100a executes the process of step ST704 described later.

Next, in step ST704, the transmission control unit 104a determines whether or not to transmit the in-vehicle monitoring information.

The determination by the transmission control unit 104a as to whether or not to transmit the in-vehicle monitoring information is performed on the basis of, for example, whether or not there is in-vehicle monitoring information generated by the in-vehicle monitoring information generating unit 103a. The transmission control unit 104a determines to transmit the in-vehicle monitoring information in a case where there is in-vehicle monitoring information generated by the in-vehicle monitoring information generating unit 103a, and determines not to transmit the in-vehicle monitoring information in a case where there is no in-vehicle monitoring information generated by the in-vehicle monitoring information generating unit 103a.

Meanwhile, the transmission control unit 104a may determine whether or not to transmit the in-vehicle monitoring information on the basis of, for example, the determination by the abnormality determination unit 102 as to whether or not an abnormality is occurring in the unmanned vehicle 1. That is, the transmission control unit 104a may determine to transmit the in-vehicle monitoring information if it is determined that no abnormality is occurring in the unmanned vehicle 1, and may determine not to transmit the in-vehicle monitoring information if it is determined that abnormality is occurring in the unmanned vehicle 1.

In step ST704, if the transmission control unit 104a determines to transmit the in-vehicle monitoring information, the transmission control unit 104a transmits the in-vehicle monitoring information generated by the in-vehicle monitoring information generating unit 103a to the outside of the unmanned vehicle 1 as described above in step ST705. After executing the process of step ST705, the in-vehicle monitoring information generation control device 100a ends the processes of the flowchart and returns to the process of step ST701 to repeatedly execute the processes of the flowchart.

In step ST704, if the transmission control unit 104a determines not to transmit the in-vehicle monitoring information, the transmission control unit 104a transmits the abnormality monitoring image based on the image acquired by the image acquisition unit 101 to the outside of the unmanned vehicle 1 as described above in step ST706. After executing the process of step ST706, the in-vehicle monitoring information generation control device 100a ends the processes of the flowchart and returns to the process of step ST701 to repeatedly execute the processes of the flowchart.

Note that the process of step ST702 may be repeatedly executed as appropriate in a background process while the flowchart illustrated in FIG. 7 is being executed.

As described above, the in-vehicle monitoring information generation control device 100a is configured in such a manner that the in-vehicle monitoring information generating unit 103a does not generate unnecessary in-vehicle monitoring information in a case where an abnormality is occurring in the unmanned vehicle 1.

With this configuration, the process can be simplified in the in-vehicle monitoring information generation control device 100a, as compared with the in-vehicle monitoring information generation control device 100 according to the first embodiment, during a period in which an abnormality is occurring in the unmanned vehicle 1.

Second Embodiment

A second embodiment will be described with reference to FIG. 8.

Figure 8:
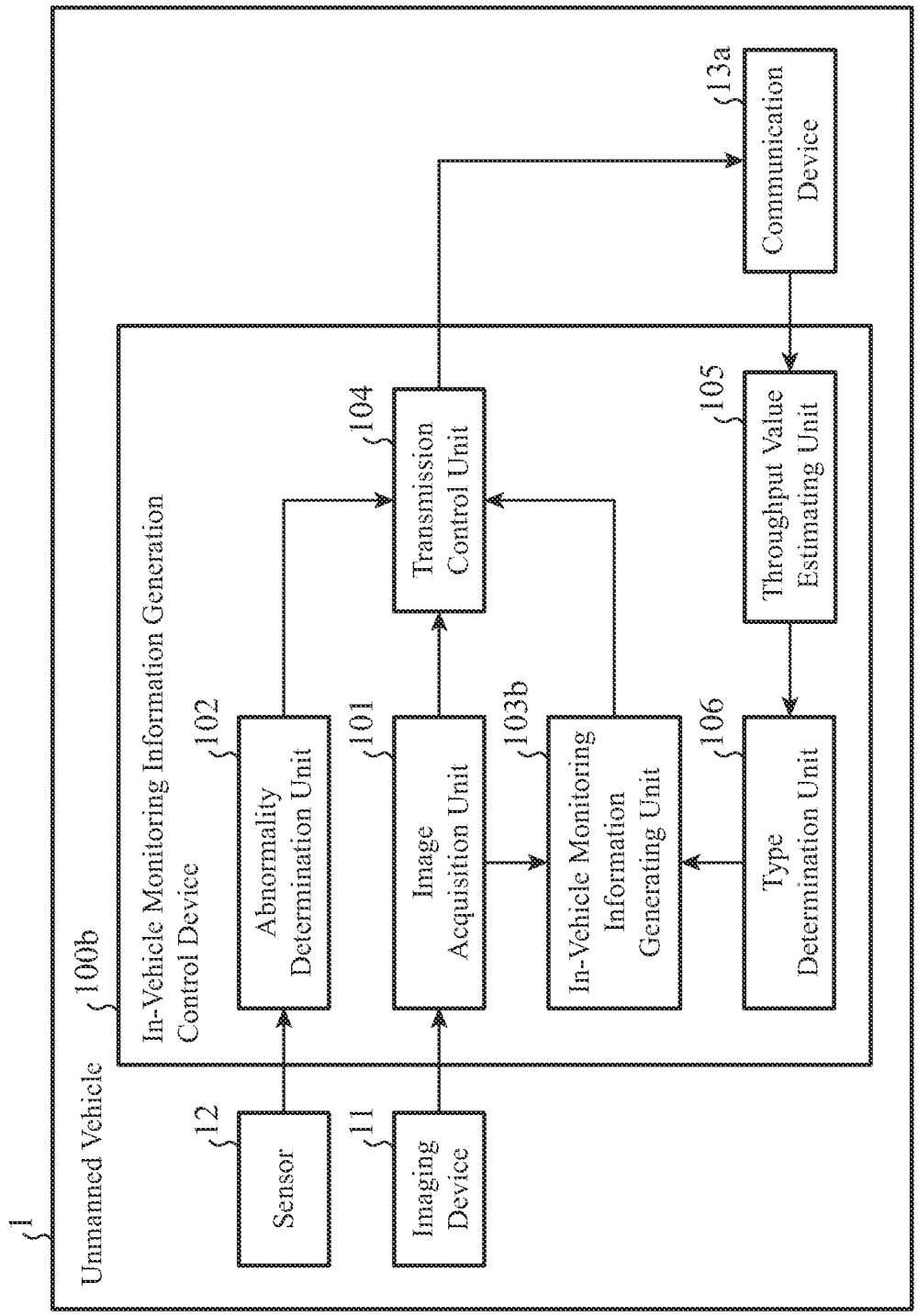
FIG. 8 is a block diagram illustrating an example of the main part of an unmanned vehicle mounted with an in-vehicle monitoring information generation control device according to a second embodiment.

FIG. 8 is a block diagram illustrating an example of the main part of an unmanned vehicle 1 mounted with an in-vehicle monitoring information generation control device 100b according to the second embodiment.

The in-vehicle monitoring information generation control device 100b according to the second embodiment is different from the in-vehicle monitoring information generation control device 100 according to the first embodiment in that the operation of an in-vehicle monitoring information generating unit 103b in the in-vehicle monitoring information generation control device 100b according to the second embodiment is different from the operation of the in-vehicle monitoring information generating unit 103 in the in-vehicle monitoring information generation control device 100 according to the first embodiment. The configuration of the in-vehicle monitoring information generation control device 100b according to the second embodiment is further different from the configuration of the in-vehicle monitoring information generation control device 100 according to the first embodiment in that a throughput value estimating unit 105 and a type determination unit 106 are added.

In the configuration of the in-vehicle monitoring information generation control device 100b according to the second embodiment, components similar to those in the in-vehicle monitoring information generation control device 100 of the first embodiment are denoted with the same symbols and redundant description will be omitted. That is, description of components in FIG. 8 denoted by the same symbols as those illustrated in FIG. 1 will be omitted.

The in-vehicle monitoring information generation control device 100b is mounted on the unmanned vehicle 1.

The unmanned vehicle 1 includes the in-vehicle monitoring information generation control device 100b, an imaging device 11, a sensor 12, and a communication device 13a.

The in-vehicle monitoring information generation control device 100b generates in-vehicle monitoring information on the basis of an image acquired from the imaging device 11, and transmits the in-vehicle monitoring information to the outside of the unmanned vehicle 1 via the communication device 13a depending on the state of the unmanned vehicle 1 determined on the basis of detection information acquired from the sensor 12.

The in-vehicle monitoring information generation control device 100b includes an image acquisition unit 101, an abnormality determination unit 102, the in-vehicle monitoring information generating unit 103b, a transmission control unit 104, the throughput value estimating unit 105, and the type determination unit 106.

The throughput value estimating unit 105 estimates a throughput value indicating the amount of data transfer per unit time when the transmission control unit 104 transmits in-vehicle monitoring information to the outside of the unmanned vehicle 1.

More specifically, for example, the throughput value estimating unit 105 estimates a throughput value on the basis of the radio wave state or the transmission state of the communication device 13*a* used by the transmission control unit 104 for transmitting the in-vehicle monitoring information to the outside of the unmanned vehicle 1.

In a case where the throughput value estimating unit 105 estimates a throughput value on the basis of the radio wave state of the communication device 13*a*, the throughput value estimating unit 105 estimates a throughput value using, for example, a look-up table included in the throughput value estimating unit 105 in advance, in which radio field intensity values that the communication device 13*a* receives from a base station of the public wireless line and expected throughput values are associated with each other in advance. The method by which the throughput value estimating unit 105 estimates a throughput value on the basis of the radio wave state of the communication device 13*a* is not limited to the above-mentioned method, and the throughput value estimating unit 105 may estimate a throughput value, for example, on the basis of a radio field intensity value that the communication device 13*a* receives from a base station of the wireless public line and a predetermined calculation formula.

In a case where the throughput value estimating unit 105 estimates a throughput value on the basis of the transmission state of the communication device 13*a*, the throughput value estimating unit 105 estimates the current throughput value, for example, on the basis of the transmission state of in-vehicle monitoring information having been transmitted via the communication device 13*a* most recently. The method by which the throughput value estimating unit 105 estimates a throughput value on the basis of the transmission state of the communication device 13*a* is not limited to the above method.

For example, the in-vehicle monitoring information generation control device 100*b* may include a means for acquiring position information of a point at which the unmanned vehicle 1 is traveling, and the throughput value estimating unit 105 may estimate a throughput value on the basis of the past transmission state of the communication device 13*a* at the point at which the unmanned vehicle 1 is traveling.

Furthermore, for example, the throughput value estimating unit 105 may estimate a throughput value by performing estimation, by artificial intelligence technology such as deep learning, based on a point, the date and time, or the weather conditions at, on, or under which the unmanned vehicle 1 is traveling, and information indicating the date and time, the weather conditions, the throughput value, or the radio field intensity as of the time when the unmanned vehicle 1 has traveled at the point in the past. Furthermore, for example, the throughput value estimating unit 105 may estimate a throughput value by estimating, by artificial intelligence technology such as deep learning, information indicating the status of communication terminals present around the point at which the unmanned vehicle 1 is traveling, information indicating the fluctuation of the throughput value in a period before the throughput value estimating unit 105 estimates the throughput value, information indicating the status of communication terminals having been present in the surrounding when the unmanned vehicle 1 has traveled in the past, or information indicating the fluctuation of the throughput value.

The type determination unit 106 determines the type of in-vehicle monitoring information generated by the in-vehicle monitoring information generating unit 103*b* on the basis of the throughput value estimated by the throughput value estimating unit 105.

The in-vehicle monitoring information generating unit 103*b* generates in-vehicle monitoring information on the basis of the type determined by the type determination unit 106.

Details of the type determination unit 106 and the in-vehicle monitoring information generating unit 103*b* will be described later.

The transmission control unit 104 transmits the in-vehicle monitoring information generated by the in-vehicle monitoring information generating unit 103*b* to the outside of the unmanned vehicle 1 in a case where it is determined that no abnormality is occurring in the unmanned vehicle 1 on the basis of a determination result determined by the abnormality determination unit 102. More specifically, the transmission control unit 104 transmits the in-vehicle monitoring information to the outside of the unmanned vehicle 1 via the communication device 13*a*. The transmission control unit 104 has been described in the first embodiment, and thus description is omitted.

Note that the functions of the image acquisition unit 101, the abnormality determination unit 102, the in-vehicle monitoring information generating unit 103*b*, the transmission control unit 104, the throughput value estimating unit 105, and the type determination unit 106 in the in-vehicle monitoring information generation control device 100*b* according to the second embodiment may be implemented by the processor 201 and the memory 202 or may be implemented by the processing circuit 203 in the hardware configurations exemplified in FIGS. 2A and 2B in the first embodiment.

Figure 9:
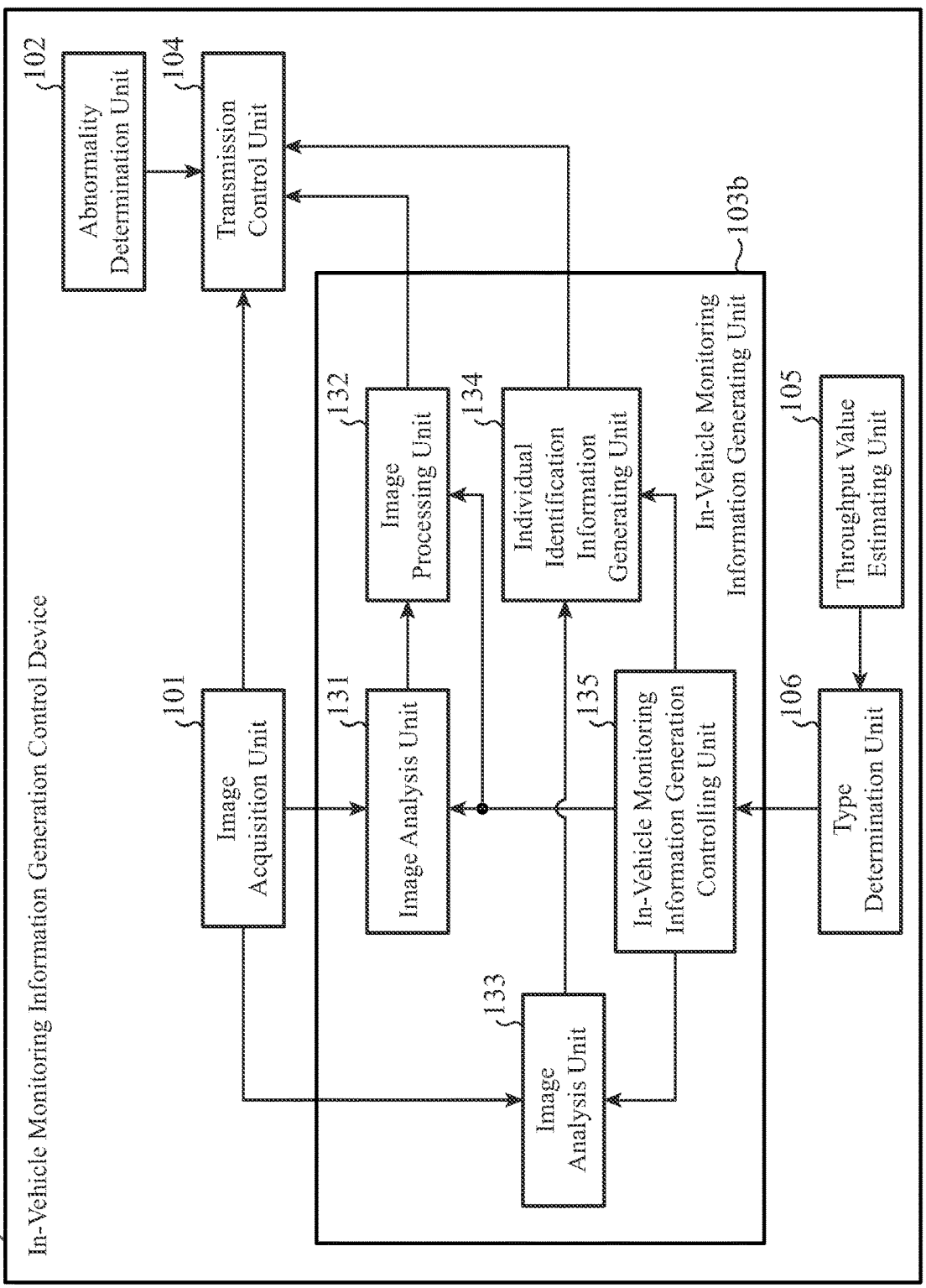
FIG. 9 is a block diagram illustrating an example of the main part of an in-vehicle monitoring information generating unit in the in-vehicle monitoring information generation control device according to the second embodiment.

With reference to FIGS. 9 and 10, the processes will be described by which the type determination unit 106 determines the type of in-vehicle monitoring information on the basis of the throughput value estimated by the throughput value estimating unit 105 and by which the in-vehicle monitoring information generating unit 103*b* generates in-vehicle monitoring information on the basis of the type determined by the type determination unit 106.

FIG. 9 is a block diagram illustrating an example of the main part of the in-vehicle monitoring information generating unit 103*b* in the in-vehicle monitoring information generation control device 100*b* according to the second embodiment.

In the configuration of the in-vehicle monitoring information generating unit 103*b* in the in-vehicle monitoring information generation control device 100*b* according to the second embodiment, components similar to those in the in-vehicle monitoring information generating unit 103 in the in-vehicle monitoring information generation control device 100 of the first embodiment are denoted with the same symbols and redundant description will be omitted. That is, description of components in FIG. 9 denoted by the same symbols as those illustrated in FIG. 3 or 4 will be omitted.

The in-vehicle monitoring information generating unit 103*b* includes, for example, an image analysis unit 131, an image processing unit 132, an image analysis unit 133, an individual identification information generating unit 134, and an in-vehicle monitoring information generation controlling unit 135.

The in-vehicle monitoring information generating unit 103*b* includes the image analysis unit 131, the image processing unit 132, the image analysis unit 133, and the individual identification information generating unit 134, and thus is capable of selectively generating, for example, deformed image information obtained by applying the above-described image deformation process on the image acquired by the image acquisition unit 101, contour image information obtained by applying the above-described contour extraction process on the image acquired by the image acquisition unit 101, or individual identification information of a passenger captured in the image identified on the basis of the image acquired by the image acquisition unit 101. The in-vehicle monitoring information generating unit 103b outputs any of the generated deformed image information, contour image information, or individual identification information as in-vehicle monitoring information on the basis of the type determined by the type determination unit 106.

The in-vehicle monitoring information generation controlling unit 135 controls, for example, the image analysis unit 131, the image processing unit 132, the image analysis unit 133, and the individual identification information generating unit 134 on the basis of the type determined by the type determination unit 106 to cause either one of the deformed image information, the contour image information, or the individual identification information to be output. Details of the in-vehicle monitoring information generation controlling unit 135 will be described later.

FIG. 10 is a table illustrating an example of a type determination table to be used by the type determination unit 106 in the in-vehicle monitoring information generation control device 100b according to the second embodiment for determining the type of in-vehicle monitoring information on the basis of a throughput value estimated by the throughput value estimating unit 105.

The type determination unit 106 determines the type of in-vehicle monitoring information on the basis of, for example, the throughput value estimated by the throughput value estimating unit 105, a preset first threshold value, a preset second threshold value to be a value smaller than the first threshold value, and a type determination table. The type determination unit 106 determines that the throughput is "high" for example when the throughput value is equal to or higher than the first threshold value, that the throughput is "intermediate" in a case where the throughput value is equal to or higher than the second threshold value and smaller than the first threshold value, and that the throughput is "low" in a case where the throughput value is smaller than the second threshold value. The type determination unit 106 compares, for example, the "high", "intermediate", or "low" of the determined throughput with "high", "intermediate", and "low" indicated by the throughput in the type determination table, and determines the type of in-vehicle monitoring information as a type that corresponds to the "high", "intermediate", or "low" of the determined throughput.

More specifically, for example in a case where the determined throughput is "high", the type determination unit 106 determines the type of in-vehicle monitoring information so that deformed image information having the largest data amount among the deformed image information, the contour image information, and the individual identification information is determined as the in-vehicle monitoring information. Meanwhile, for example in a case where the determined throughput is "intermediate", the type determination unit 106 determines the type of in-vehicle monitoring information so that contour image information having the largest data amount second to the deformed image information among the deformed image information, the contour image information, and the individual identification information is determined as the in-vehicle monitoring information. Alternatively, for example in a case where the determined throughput is "low", the type determination unit 106 determines the type of in-vehicle monitoring information so that individual identification information having the smallest data amount among the deformed image information, the contour image information, and the individual identification information is determined as the in-vehicle monitoring information.

The in-vehicle monitoring information generation controlling unit 135 controls, for example, the image analysis unit 131, the image processing unit 132, the image analysis unit 133, and the individual identification information generating unit 134 on the basis of the type determined by the type determination unit 106 as described above.

Specifically, for example in a case where the type determined by the type determination unit 106 is deformed image information, the in-vehicle monitoring information generation controlling unit 135 causes the image analysis unit 131 and the image processing unit 132 to execute processing. More specifically, for example, the in-vehicle monitoring information generation controlling unit 135 causes the image processing unit 132 to execute the image deformation process such as pixelization or blurring on an area of the passenger's face detected by the image analysis unit 131 in the image acquired by the image acquisition unit 101.

Meanwhile, for example in a case where the type determined by the type determination unit 106 is contour image information, the in-vehicle monitoring information generation controlling unit 135 causes the image analysis unit 131 and the image processing unit 132 to execute processing. More specifically, for example, the in-vehicle monitoring information generation controlling unit 135 causes the image processing unit 132 to execute the contour extraction process such as filling in black or a masking process on an area of the passenger's face detected by the image analysis unit 131 in the image acquired by the image acquisition unit 101.

Alternatively, for example in a case where the type determined by the type determination unit 106 is individual identification information, the in-vehicle monitoring information generation controlling unit 135 causes the image analysis unit 133 and the individual identification information generating unit 134 to execute processing.

The operation of the in-vehicle monitoring information generation control device 100b according to the second embodiment will be described with reference to FIG. 11.

Figure 11:
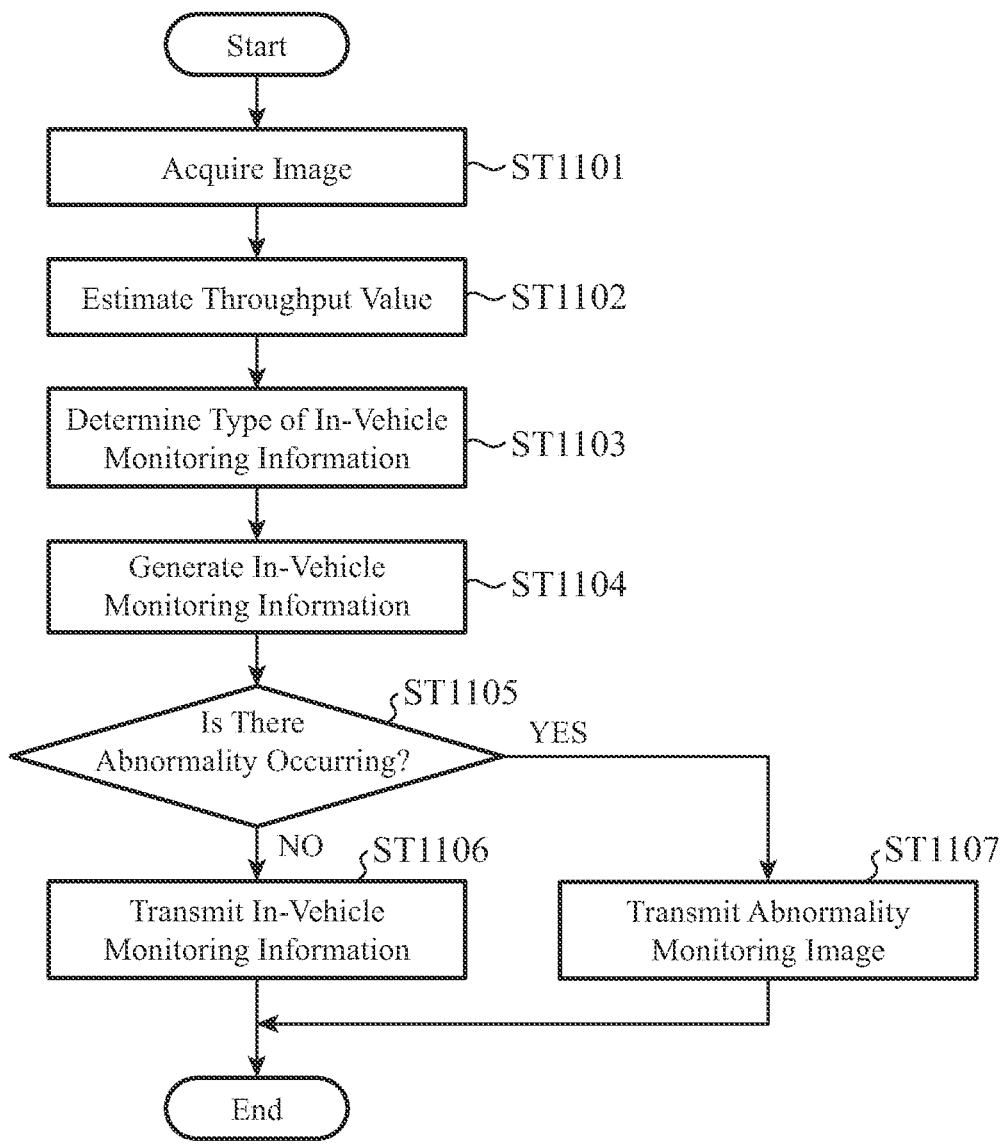
FIG. 11 is a flowchart illustrating an example of processes of the in-vehicle monitoring information generation control device according to the second embodiment.

FIG. 11 is a flowchart illustrating an example of processes of the in-vehicle monitoring information generation control device 100b according to the second embodiment.

First, in step ST1101, the image acquisition unit 101 acquires an image generated by capturing the inside of the unmanned vehicle 1 from the imaging device 11 as described above.

Next, in step ST1102, the throughput value estimating unit 105 estimates a throughput value indicating the amount of data transfer per unit time when the transmission control unit 104 transmits in-vehicle monitoring information to the outside of the unmanned vehicle 1 as described above.

Next, in step ST1103, the type determination unit 106 determines the type of in-vehicle monitoring information generated by the in-vehicle monitoring information generating unit 103b on the basis of the throughput value estimated by the throughput value estimating unit 105 as described above.

Next, in step ST1104, the in-vehicle monitoring information generating unit 103b generates, as described above, in-vehicle monitoring information on the basis of the type determined by the type determination unit 106.

Next, in step ST1105, the abnormality determination unit 102 determines whether or not an abnormality is occurring in unmanned vehicle 1 as described above.

If the abnormality determination unit 102 determines in step ST1105 that no abnormality is occurring in the unmanned vehicle 1, the transmission control unit 104 transmits the in-vehicle monitoring information generated by the in-vehicle monitoring information generating unit 103b to the outside of the unmanned vehicle 1 as described above in step ST1106. After executing the process of step ST1106, the in-vehicle monitoring information generation control device 100b ends the processes of the flowchart and returns to the process of step ST1101 to repeatedly execute the processes of the flowchart.

If the abnormality determination unit 102 determines in step ST1105 that an abnormality is occurring in the unmanned vehicle 1, the transmission control unit 104 transmits an abnormality monitoring image based on the image acquired by the image acquisition unit 101 to the outside of the unmanned vehicle 1 as described above in step ST1107. After executing the process of step ST1107, the in-vehicle monitoring information generation control device 100b ends the processes of the flowchart and returns to the process of step ST1101 to repeatedly execute the processes of the flowchart.

Note that the processes of steps ST1102 and ST1105 may be repeatedly executed as appropriate in a background process while the flowchart illustrated in FIG. 11 is being executed.

As described above, the in-vehicle monitoring information generation control device 100b includes: the image acquisition unit 101 for acquiring an image generated by capturing the inside of the unmanned vehicle 1; the abnormality determination unit 102 for determining whether or not an abnormality is occurring in the unmanned vehicle 1; the in-vehicle monitoring information generating unit 103b for generating in-vehicle monitoring information, with which no passenger in the unmanned vehicle 1 who is captured in the image can be identified, on the basis of the image acquired by the image acquisition unit 101; the transmission control unit 104 for transmitting the in-vehicle monitoring information generated by the in-vehicle monitoring information generating unit 103b to the outside of the unmanned vehicle 1 in a case where it is determined that no abnormality is occurring in the unmanned vehicle 1 on the basis of a determination result determined by the abnormality determination unit 102; the throughput value estimating unit 105 for estimating a throughput value indicating the amount of data transfer per unit time when the transmission control unit 104 transmits the in-vehicle monitoring information to the outside of the unmanned vehicle 1; and the type determination unit 106 for determining the type of in-vehicle monitoring information generated by the in-vehicle monitoring information generating unit 103b on the basis of the throughput value estimated by the throughput value estimating unit 105, and the in-vehicle monitoring information generating unit 103b generates the in-vehicle monitoring information on the basis of the type determined by the type determination unit 106.

With this configuration, the in-vehicle monitoring information generation control device 100b can monitor the inside of the vehicle with consideration for privacy of passengers while allowing the in-vehicle monitoring information to correspond to the throughput value indicating the amount of data transfer per unit time when the in-vehicle monitoring information is transmitted to the outside of the unmanned vehicle 1.

Third Embodiment

A third embodiment will be described with reference to FIG. 12.

Figure 12:
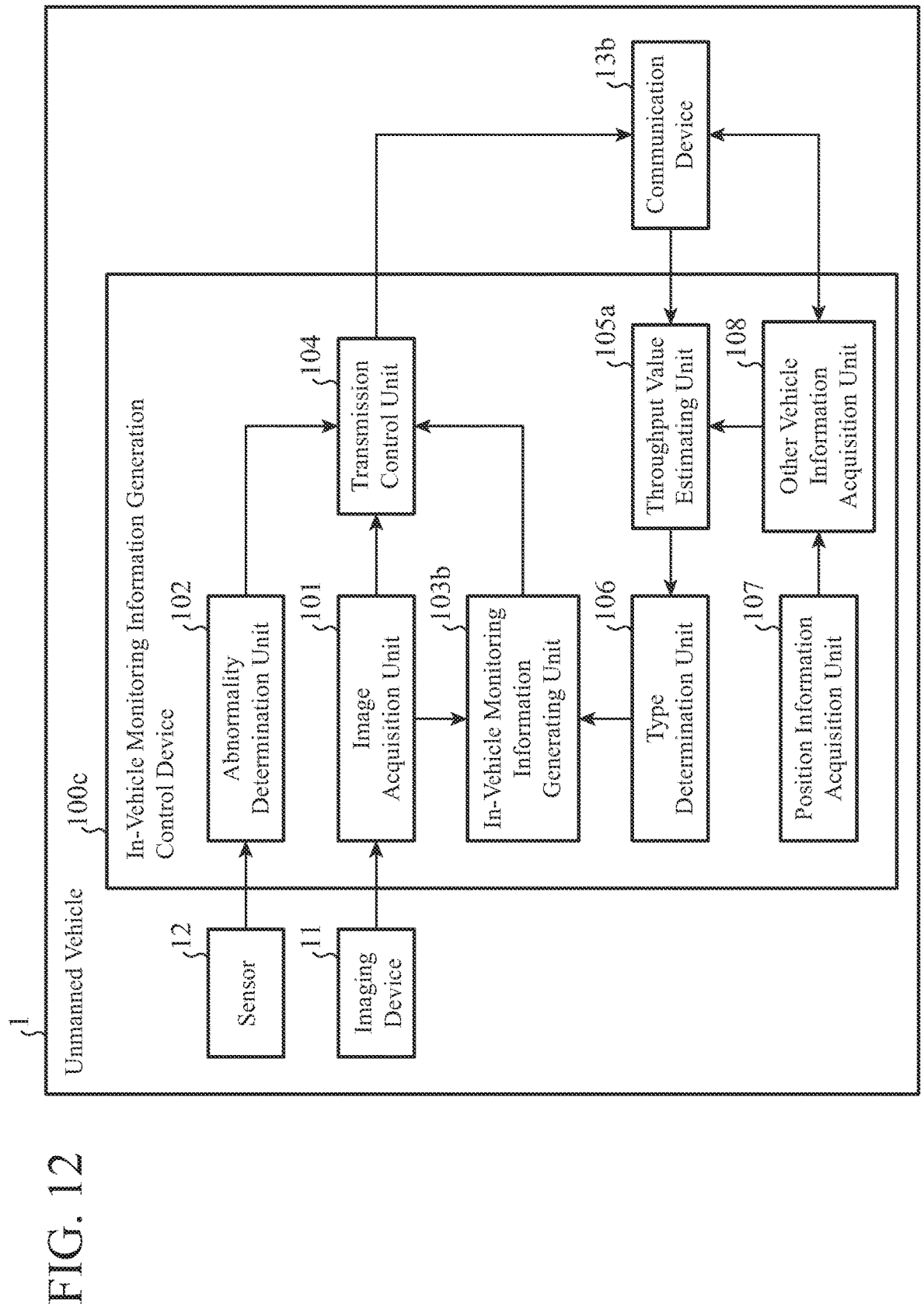
FIG. 12 is a block diagram illustrating an example of the main part of an in-vehicle monitoring information generating unit in an in-vehicle monitoring information generation control device according to a third embodiment.

FIG. 12 is a block diagram illustrating an example of the main part of an unmanned vehicle 1 mounted with an in-vehicle monitoring information generation control device 100c according to the third embodiment.

The in-vehicle monitoring information generation control device 100c according to the third embodiment is different from the in-vehicle monitoring information generation control device 100b according to the second embodiment in that the operation of a throughput value estimating unit 105a in the in-vehicle monitoring information generation control device 100c according to the third embodiment is different from the operation of the throughput value estimating unit 105 in the in-vehicle monitoring information generation control device 100b according to the second embodiment. The configuration of the in-vehicle monitoring information generation control device 100c according to the third embodiment is further different from the configuration of the in-vehicle monitoring information generation control device 100b according to the second embodiment in that a position information acquisition unit 107 and an other vehicle information acquisition unit 108 are added.

In the configuration of the in-vehicle monitoring information generation control device 100c according to the third embodiment, components similar to those in the in-vehicle monitoring information generation control device 100b of the second embodiment are denoted with the same symbols and redundant description will be omitted. That is, description of components in FIG. 12 denoted by the same symbols as those illustrated in FIG. 8 will be omitted.

The in-vehicle monitoring information generation control device 100c is mounted on the unmanned vehicle 1 that travels by unmanned driving.

The unmanned vehicle 1 includes the in-vehicle monitoring information generation control device 100c, an imaging device 11, a sensor 12, and a communication device 13b.

The in-vehicle monitoring information generation control device 100c generates in-vehicle monitoring information on the basis of an image acquired from the imaging device 11, and transmits the in-vehicle monitoring information to the outside of the unmanned vehicle 1 via the communication device 13b depending on the state of the unmanned vehicle 1 determined on the basis of detection information acquired from the sensor 12.

The in-vehicle monitoring information generation control device 100c includes an image acquisition unit 101, an abnormality determination unit 102, an in-vehicle monitoring information generating unit 103b, a transmission control unit 104, the throughput value estimating unit 105a, a type determination unit 106, the position information acquisition unit 107, and the other vehicle information acquisition unit 108.

The position information acquisition unit 107 acquires position information indicating the position where the unmanned vehicle 1 is traveling. More specifically, for example, the position information acquisition unit 107 acquires position information indicating the position where the unmanned vehicle 1 is traveling from an autonomous driving system (not illustrated) mounted on the unmanned vehicle 1 traveling without a driver. The method by which the position information acquisition unit 107 acquires the position information indicating the position where the unmanned vehicle 1 travels is not limited to the above method. For example, the position information acquisition unit 107 may generate position information indicating the position where the unmanned vehicle 1 is traveling on the basis of a navigation signal acquired from a navigation signal receiver (not illustrated) that receives navigation signals such as GPS signals from navigation satellites.

The other vehicle information acquisition unit 108 acquires other vehicle information indicating a radio wave state or a transmission state of a communication device (not illustrated) mounted on another vehicle (not illustrated) traveling at a position within a predetermined range from the position where the unmanned vehicle 1 is traveling.

More specifically, for example, the other vehicle information acquisition unit 108 transmits the position information indicating the position where the unmanned vehicle 1 is traveling that is acquired by the position information acquisition unit 107 to an external device or an external system such as a remote monitoring device or a remote monitoring system provided outside the unmanned vehicle 1 via the communication device 13b, and the other vehicle information acquisition unit 108 acquires other vehicle information indicating a radio wave state or a transmission state of a communication device mounted on another vehicle traveling at a position within a predetermined range from the position where the unmanned vehicle 1 is traveling from the external device or the external system via the communication device 13b.

A position within a predetermined range from the position where the unmanned vehicle 1 is traveling means, more specifically, for example, a position within a range surrounded by a circle having a radius of 300 meters centered on the position where the unmanned vehicle 1 is traveling. A position within a predetermined range from the position where the unmanned vehicle 1 is traveling is not limited to the above-described point. For example, a position within a predetermined range from the position where the unmanned vehicle 1 is traveling may be a position on a route where the unmanned vehicle 1 is scheduled to travel and within a predetermined range from the position where the unmanned vehicle 1 is traveling.

The method by which the other vehicle information acquisition unit 108 acquires the other vehicle information is not limited to the above methods. For example, the other vehicle information acquisition unit 108 may acquire other vehicle information from another vehicle by a known inter-vehicle communication technology.

The throughput value estimating unit 105a estimates a throughput value on the basis of the radio wave state or the transmission state in the unmanned vehicle 1 and the radio wave state or the transmission state in another vehicle included in the other vehicle information acquired by the other vehicle information acquisition unit 108.

More specifically, for example, the throughput value estimating unit 105a estimates a throughput value by comparing the radio wave state or the transmission state in the unmanned vehicle 1 with the radio wave state or the transmission state in the other vehicle and using a poorer radio wave state or transmission state.

The method by which the throughput value estimating unit 105a estimates a throughput value on the basis of the radio wave state or the transmission state in the unmanned vehicle 1 and the radio wave state or the transmission state in the other vehicle is not limited to the above method. For example, a throughput value may be estimated on the basis of a radio wave state and a transmission state obtained by weighted-averaging the radio wave state or the transmission state in the unmanned vehicle 1 and the radio wave state or the transmission state in the other vehicle with respect to, for example, the distance between the unmanned vehicle 1 and the other vehicle.

Note that the functions of the image acquisition unit 101, the abnormality determination unit 102, the in-vehicle monitoring information generating unit 103b, the transmission control unit 104, the throughput value estimating unit 105a, the type determination unit 106, the position information acquisition unit 107, and the other vehicle information acquisition unit 108 in the in-vehicle monitoring information generation control device 100c according to the third embodiment may be implemented by the processor 201 and the memory 202 or may be implemented by the processing circuit 203 in the hardware configurations exemplified in FIGS. 2A and 2B in the first embodiment.

The operation of the in-vehicle monitoring information generation control device 100c according to the third embodiment will be described with reference to FIG. 13.

Figure 13:
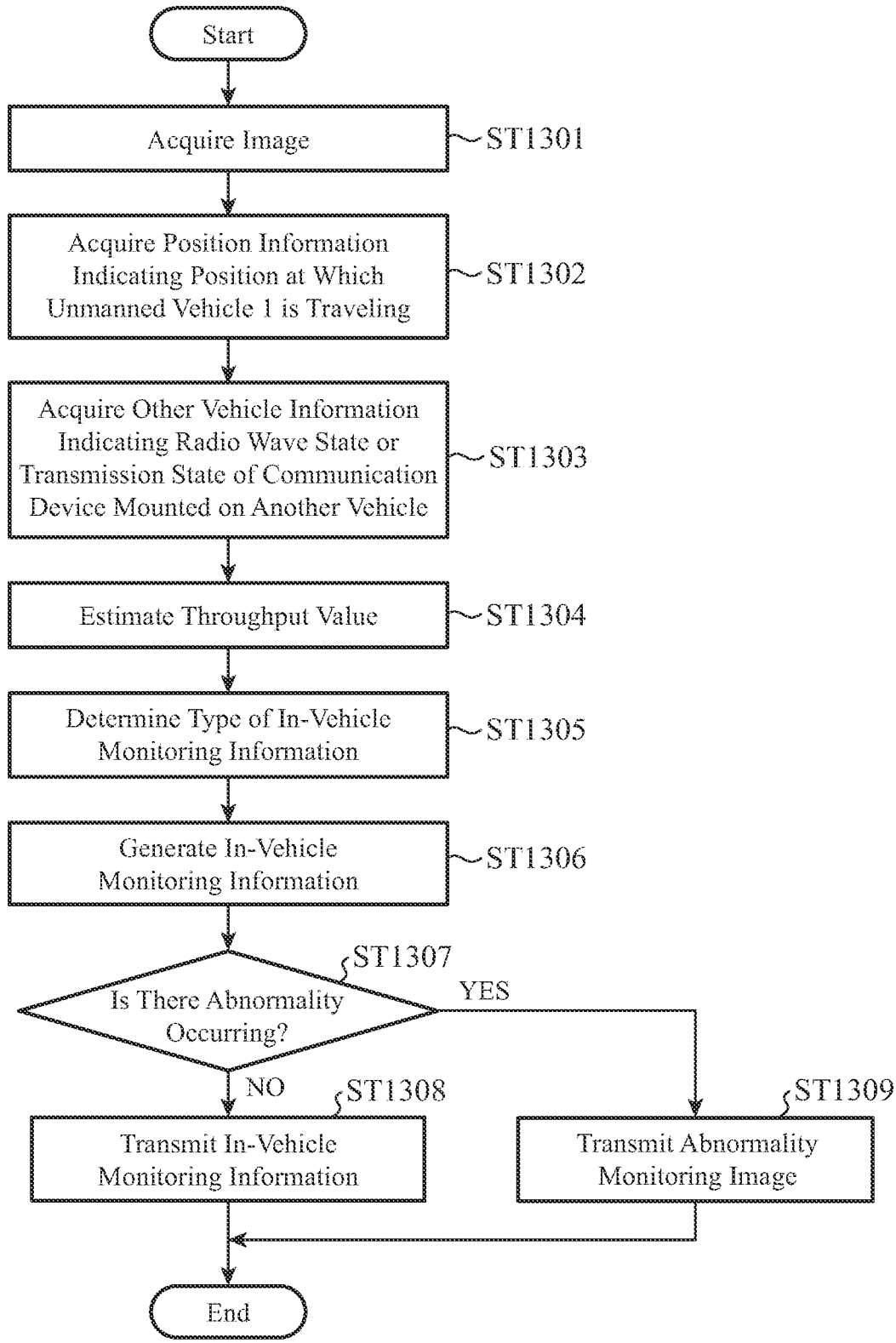
FIG. 13 is a flowchart illustrating an example of processes of the in-vehicle monitoring information generation control device according to the third embodiment.

FIG. 13 is a flowchart illustrating an example of processes of the in-vehicle monitoring information generation control device 100c according to the third embodiment.

First, in step ST1301, the image acquisition unit 101 acquires an image generated by capturing the inside of the unmanned vehicle 1 from the imaging device 11 as described above.

Next, in step ST1302, the position information acquisition unit 107 acquires position information of the point at which the unmanned vehicle 1 is traveling as described above.

Next, in step ST1303, the other vehicle information acquisition unit 108 acquires other vehicle information indicating a radio wave state or a transmission state of a communication device mounted on another vehicle traveling at a position within a predetermined range from the position where the unmanned vehicle 1 is traveling as described above.

Next, in step ST1304, the throughput value estimating unit 105a estimates a throughput value indicating the amount of data transfer per unit time when the transmission control unit 104 transmits in-vehicle monitoring information to the outside of the unmanned vehicle 1 as described above.

Next, in step ST1305, the type determination unit 106 determines the type of in-vehicle monitoring information generated by the in-vehicle monitoring information generating unit 103b on the basis of the throughput value estimated by the throughput value estimating unit 105a as described above.

Next, in step ST1306, the in-vehicle monitoring information generating unit 103b generates, as described above, in-vehicle monitoring information on the basis of the type determined by the type determination unit 106.

Next, in step ST1307, the abnormality determination unit 102 determines whether or not an abnormality is occurring in unmanned vehicle 1 as described above.

If the abnormality determination unit 102 determines in step ST1307 that no abnormality is occurring in the unmanned vehicle 1, the transmission control unit 104 transmits the in-vehicle monitoring information generated by the in-vehicle monitoring information generating unit 103b to the outside of the unmanned vehicle 1 as described above in step ST1308. After the process of step ST1308, the in-vehicle monitoring information generation control device 100c ends the processes of the flowchart and returns to the process of step ST1301 to repeatedly execute the processes of the flowchart.

If the abnormality determination unit 102 determines in step ST1307 that an abnormality is occurring in the unmanned vehicle 1, the transmission control unit 104 transmits an abnormality monitoring image based on the image acquired by the image acquisition unit 101 to the outside of the unmanned vehicle 1 as described above in step ST1309. After the process of step ST1309, the in-vehicle monitoring information generation control device 100c ends the processes of the flowchart and returns to the process of step ST1301 to repeatedly execute the processes of the flowchart.

Note that the processes of steps ST1301, ST1302, ST1304, and ST1307 may be repeatedly executed as appropriate in a background process while the flowchart illustrated in FIG. 13 is being executed.

As described above, the in-vehicle monitoring information generation control device 100c includes: the image acquisition unit 101 for acquiring an image generated by capturing the inside of the unmanned vehicle 1; the abnormality determination unit 102 for determining whether or not an abnormality is occurring in the unmanned vehicle 1; the in-vehicle monitoring information generating unit 103b for generating in-vehicle monitoring information, with which no passenger in the unmanned vehicle 1 who is captured in the image can be identified, on the basis of the image acquired by the image acquisition unit 101; the transmission control unit 104 for transmitting the in-vehicle monitoring information generated by the in-vehicle monitoring information generating unit 103b to the outside of the unmanned vehicle 1 in a case where it is determined that no abnormality is occurring in the unmanned vehicle 1 on the basis of a determination result determined by the abnormality determination unit 102; the throughput value estimating unit 105a for estimating a throughput value indicating the amount of data transfer per unit time when the transmission control unit 104 transmits the in-vehicle monitoring information to the outside of the unmanned vehicle 1; the type determination unit 106 for determining the type of in-vehicle monitoring information generated by the in-vehicle monitoring information generating unit 103b on the basis of the throughput value estimated by the throughput value estimating unit 105a; and an other vehicle information acquisition unit 108 for acquiring another vehicle information indicating a radio wave state or a transmission state of a communication device mounted on another vehicle traveling at a position within a predetermined range from the position where the unmanned vehicle 1 is traveling, in which the throughput value estimating unit 105a estimates a throughput value on the basis of the radio wave state or the transmission state in the unmanned vehicle 1 and the radio wave state or the transmission state in the other vehicle included in the other vehicle information acquired by the other vehicle information acquisition unit 108, and the in-vehicle monitoring information generating unit 103b generates the in-vehicle monitoring information on the basis of the type determined by the type determination unit 106.

With this configuration, the in-vehicle monitoring information generation control device 100c can estimate a throughput value, indicating the amount of data transfer per unit time when in-vehicle monitoring information is transmitted to the outside of the unmanned vehicle 1, more accurately.

Note that the present invention may include a flexible combination of the embodiments, a modification of any component of the embodiments, or an omission of any component in the embodiments within the scope of the present invention.

INDUSTRIAL APPLICABILITY

An in-vehicle monitoring information generation control device according to the present invention can be applied to unmanned vehicles.

REFERENCE SIGNS LIST

1: unmanned vehicle, 11: imaging device, 12: sensor, 13, 13a, 13b: communication device, 100, 100a, 100b, 100c: in-vehicle monitoring information generation control device, 101: image acquisition unit, 102: abnormality determination unit, 103, 103a, 103b: in-vehicle monitoring information generating unit, 104, 104a: transmission control unit, 105, 105a: throughput value estimating unit, 106: type determination unit, 107: position information acquisition unit, 108: other vehicle information acquisition unit, 131, 133: image analysis unit, 132: image processing unit, 134: individual identification information generating unit, 135: in-vehicle monitoring information generation controlling unit, 201: processor, 202: memory, 203: processing circuit

The invention claimed is:

1. An in-vehicle monitoring information generation control device comprising processing circuitry to acquire an image generated by capturing an inside of an unmanned vehicle, to generate a determination result of determining whether or not an abnormality is occurring in the unmanned vehicle, to generate in-vehicle monitoring information, with which no passenger in the unmanned vehicle who is captured in the image can be identified, on a basis of the image, to transmit the in-vehicle monitoring information to an outside of the unmanned vehicle in a case where it is determined that no abnormality is occurring in the unmanned vehicle on a basis of the determination result, to estimate a throughput value indicating an amount of data transfer per unit time when the in-vehicle monitoring information is transmitted to the outside of the unmanned vehicle, and to determine a type of the in-vehicle monitoring information on a basis of the throughput value being estimated, wherein the type of the in-vehicle monitoring information being determined on a basis of the throughput value is any one of deformed image information obtained by deforming an area of the passenger captured in the image, contour image information obtained by extracting a contour of the area, or individual identification information that identifies the passenger captured in the image, and the processing circuitry generates the in-vehicle monitoring information on a basis of the type.

2. The in-vehicle monitoring information generation control device according to claim 1, wherein an abnormality monitoring image based on the image is transmitted to the outside of the unmanned vehicle in a case where it is determined that an abnormality is occurring in the unmanned vehicle.

3. The in-vehicle monitoring information generation control device according to claim 1, wherein the throughput value is estimated on a basis of a radio wave state or a transmission state of a communication device for transmitting the in-vehicle monitoring information to the outside of the unmanned vehicle.

4. The in-vehicle monitoring information generation control device according to claim 3, wherein the processing circuitry acquires another vehicle information indicating a radio wave state or a transmission state of the communication device mounted on the other vehicle traveling at a position within a predetermined range from a position where the unmanned vehicle is traveling, and
> wherein the throughput value is estimated on a basis of a radio wave state or a transmission state in the unmanned vehicle, and a radio wave state or a transmission state in the other vehicle included in the other vehicle information.

5. The in-vehicle monitoring information generation control device according to claim 1, wherein the in-vehicle monitoring information, with which the passenger captured in the image cannot be identified, is generated by performing an image deformation process on the area in the image of the passenger captured in the image.

6. The in-vehicle monitoring information generation control device according to claim 1, wherein the in-vehicle monitoring information, with which the passenger captured in the image cannot be identified, is generated by performing a contour extraction process on the area in the image of the passenger captured in the image.

7. An in-vehicle monitoring information generation control method comprising:
> acquiring an image generated by capturing an inside of an unmanned vehicle;
> generating a determination result of determining whether or not an abnormality is occurring in the unmanned vehicle;
> generating in-vehicle monitoring information, with which no passenger in the unmanned vehicle who is captured in the image can be identified, on a basis of the image;
> transmitting the in-vehicle monitoring information to an outside of the unmanned vehicle in a case where it is determined that no abnormality is occurring in the unmanned vehicle on a basis of the determination result;
> estimating a throughput value indicating an amount of data transfer per unit time when the in-vehicle monitoring information is transmitted to the outside of the unmanned vehicle; and
> determining a type of the in-vehicle monitoring information on a basis of the throughput value being estimated,
> wherein the type of the in-vehicle monitoring information being determined on a basis of the throughput value is any one of deformed image information obtained by deforming an area of the passenger captured in the image, contour image information obtained by extracting a contour of the area, or individual identification information that identifies the passenger captured in the image, and
> the in-vehicle monitoring information is generated on a basis of the type.

\* \* \* \* \*